Jan. 2, 1962     H. J. WHITE ET AL     3,015,356
METHOD OF MAKING A DECORATIVE COMPOSITION SHEET
Filed May 31, 1957     3 Sheets-Sheet 1

INVENTORS.
ANTHONY N. PIACENTE
HAROLD J. WHITE

ATTORNEY

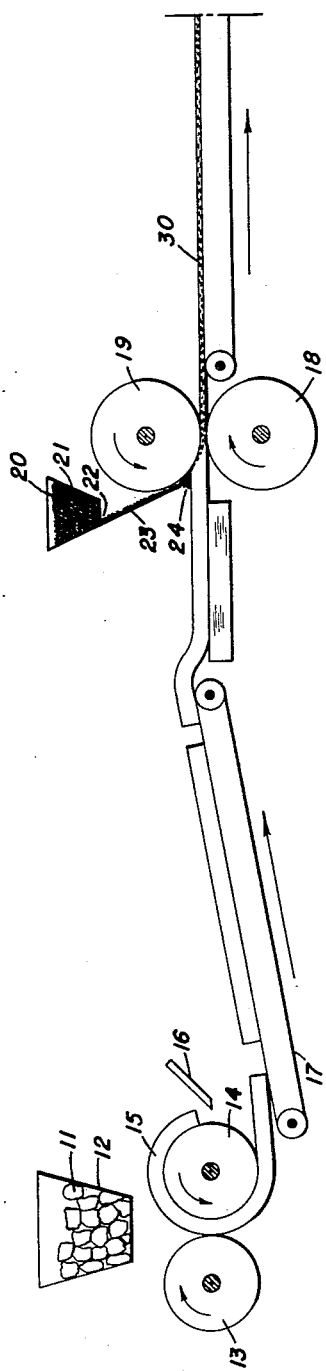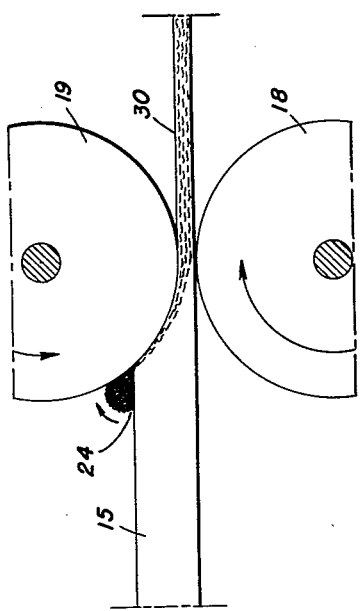

Jan. 2, 1962   H. J. WHITE ET AL   3,015,356
METHOD OF MAKING A DECORATIVE COMPOSITION SHEET
Filed May 31, 1957   3 Sheets-Sheet 3

INVENTORS.
ANTHONY N. PIACENTE
HAROLD J. WHITE
BY
ATTORNEY

United States Patent Office 3,015,356
Patented Jan. 2, 1962

3,015,356
METHOD OF MAKING A DECORATIVE
COMPOSITION SHEET
Harold J. White, Maplewood, and Anthony N. Piacente, North Arlington, N.J., assignors to Congoleum-Nairn Inc., Kearney, N.J., a corporation of New York
Filed May 31, 1957, Ser. No. 662,787
18 Claims. (Cl. 18—59)

This invention relates to a method and apparatus for producing decorative sheet material and particularly to the production of such sheets having a unique design for use as flexible smooth surface covering for floors, walls, articles of furniture and the like.

Calendered sheets of composition material which are of variegated appearance, such as linoleum and vinyl compositions, have been produced by mixing together different colored pieces of the composition material and, while the mixed pieces are of plastic and moldable consistency, subjecting them to one or more calendering operations under conditions which are suitably controlled for producing the appearance desired. As an example, linoleum composition sheets are formed by mixing colored pieces of linoleum composition together and then calendering. During the passage of the pieces through the calender, they retain their individual colors but are subject to distinct distortional commingling. This distortional commingling is evidenced in the product of the first calendering by the fact that the pieces have become stretched out into long streaks to provide a striated effect that is commonly referred to as "jaspe." In addition to the jaspe effect, a simulated marble effect can be produced by further distortional commingling of the pieces of different color. This is usually accomplished by cutting previously formed jaspe sheets into lengths, turning the lengths 90°, lapping the turned lengths and calendering the lapped lengths. The lapped jaspe sheets are calendering with the jaspe streaks generally parallel to the calender rolls. This operation causes the jaspe streaks to be pulled transversely with the resultant production of a sheet having an appearance resembling marble.

A variegated color effect resembling spattered paint has been produced, particularly in connection with relatively heavy composition sheets, by initially forming a sheet having substantially uniform color throughout by passage between rolls and then adding pieces of contrasting color which are essentially the same plastic consistency as that of the sheet to which they are added. The sheet is then subjected to a calendering operation to imbed the pieces into the initially formed sheet with little altering of the shape of the pieces. This method is used quite extensively in producing decorative effects in what is commonly termed asphalt and vinyl asbestos tile.

A great deal of work has been carried out to produce other different and novel decorative effects in composition sheets. Most of the novel type designs have been developed in the field of the molded type product. The molded type product is produced by applying pieces of composition material to a backing or mold in a prearranged or random manner and then pressing the pieces in a flat bed press to form a smooth, homogeneous sheet. This procedure, although capable of producing a large range of decorative and novel designs, is naturally a more expensive procedure since the pressing operation must be carried out in a step-wise manner.

A general object of the invention is to provide a process and apparatus for producing a flexible smooth surface covering having a novel decoration. Another object of the invention is to produce a decorative sheet having substantial amounts of non-directional design by the utilization of conventional high-speed calendering equipment. A specific object is to provide such a composition sheet having extremely long-wearing characteristics. A further object of the invention is to provide a process and apparatus for producing a decorative sheet which is applicable to a large range of composition materials.

In accordance with the invention, a decorative sheet of composition material is produced by feeding between calender rolls a thick sheet of composition material while maintaining on the surface of the sheet at the nip of the rolls a rolling bank of various sized pieces of decorative material and, during the passage of the sheet material between the rolls, substantially reducing the gauge of the sheet. By this method, a decoration is produced in the sheet which closely resembles driftwood or pecky cypress in appearance, having areas of both directional and non-directional decoration.

The substantial reduction of the gauge of the sheet during calendering, while maintaining the bank at the nip of the rolls, has the effect of limiting the amount of decorative pieces which are pulled between the rolls. By this novel procedure, the calender rolls control the amount of decorative pieces pressed into the surface of the sheet and, thereby, control the design produced. This simple expedient of controlling the rate of feed of decorative pieces by gauge reduction enables the production of designs heretofore unattainable.

Other objects, features and advantages of the invention will be apparent from the following detailed description of the invention when read in conjunction with the accompanying drawings in which:

FIG. 2 is a diagrammatic side elevation which is illustrative of one type of apparatus which can be used in the practice of the invention.

FIG. 3 is an enlarged view of a section of the apparatus shown in FIG. 2, illustrating the reduction in gauge of the sheet and the rolling bank of decorative pieces.

Figure 1:
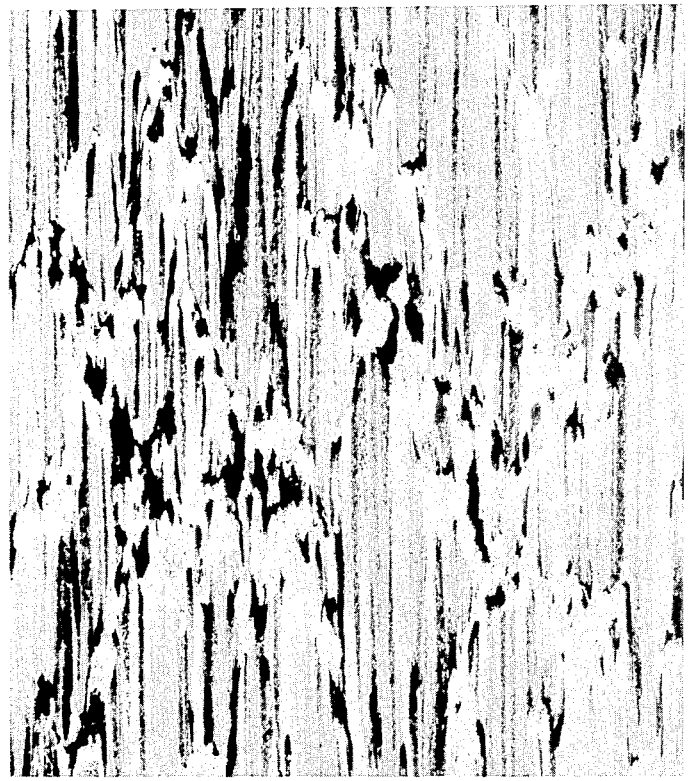
FIG. 1 is a plane view on a reduced scale of a smooth surface covering which illustrates the effect that can be produced in accordance with the process of the invention.

The surface covering shown in FIG. 1 illustrates how the decorative pieces applied to the surface of the composition sheet have been distorted in a random manner so that the appearance closely resembles that of driftwood or pecky cypress. This effect can be produced, for example, by the apparatus shown in FIGS. 2 and 3.

Composition material, hereinafter defined, is produced by mixing at a temperature sufficiently high to produce a plastic mass. The composition material is then fed while plastic to a hopper 12 which dumps a measured charge of material between the nip of two horizontal rolls 13 and 14. The rolls are rotated in opposite directions and the face roll 14 is rotated at a slightly greater speed. A speed ratio of about 1:1.1 has been found satisfactory. The rolls are maintained at a temperature suitable to produce a sheet of composition material. The composition material 11 is permitted to revolve with the face rolls 14 until it has been formed on the roll into a smooth thick sheet of uniform size. This operation usually requires 4 or 5 complete revolutions of the rolls. The sheet 15 thus formed is stripped from the roll 14 by any suitable means such as cutting with a knife and pulling off or by the engagement of a doctor blade 16 or other suitable severing device. The sheet 15, as it passes from the roll 14, is picked up by a conveyor 17 which carries the sheet forward. The thickness of the sheet will depend a great deal on the components of the composition material and the thickness desired in the final sheet. When the final sheet is to be 0.125 inch thick, the sheet is preferably about 0.375 inch to about 1.75 inches thick.

The sheet 15 is carried by the conveyor belt 17 to a point where it is fed between two calender rolls 18 and 19. The gauge of the sheet is reduced to at least one-third of its original thickness as it passes between these rolls 18 and 19. The gauge reduction depends in part upon the plasticity of the material. The greater the plasticity, the greater the gauge reduction necessary to produce the desired effect. Normally, the gauge reduction does not exceed a reduction to one-tenth or one-fifteenth of its original thickness.

The decorative stock 20, comprising pieces of composition generally compatible with the base sheet, is fed from a hopper 21 by means of a strickler or similar feeder 22 onto a flat chute 23 which carries the decorative pieces and deposits them on top of the sheet at the nip of the two rolls 18 and 19. The decorative pieces are supplied in such quantity as to form a small rolling bank 24 at the nip of the rolls which revolves in a direction opposite to that of the top calender roll 19. This rolling of the bank 24 of decorative stock is caused by the action of the calender roll 19 in allowing only part of the decorative stock to pass with the sheet material between the rolls. Careful control of this bank is maintained to prevent it from becoming too large and, thereby, losing its rolling character. An excess of material will result in materially hampering the amount of pieces which are pressed into the sheet. The calender rolls 18 and 19 are driven at approximately the same speed and the decorative pieces are pressed into the sheet so that some of the pieces are pulled or elongated and others form blotches, thereby creating the novel decoration of the invention. A similar result can be obtained by placing the decorative stock in sufficient quantities on the surface of the sheet so as to cause a rolling bank to form at the nip of the calender rolls. A bank of decorative stock of about ¼ to ¾ inch in diameter is usually sufficient.

The finished sheet 30 can be subjected to any desired further treatment, such as further gauge reduction, polishing and smoothing operations or laminating operations to laminate a backing, such as felt, to the sheet. The gauge of the sheet can be materially reduced without effecting the decoration although it must be reduced in stages of small increments. The sheet can then be cut into tiles, such as a conventional 9 x 9" tile or rolled up for use as sheet goods.

Figure 4:
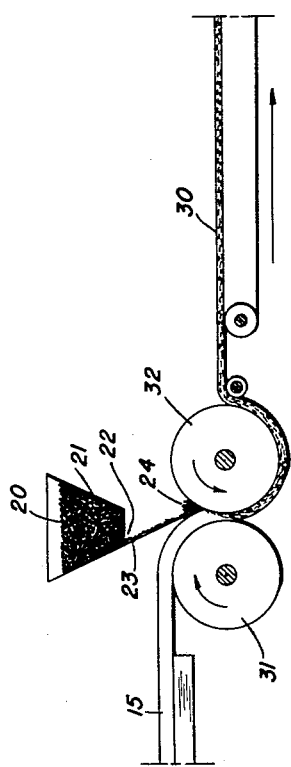
FIG. 4 is a diagrammatic side elevation which is illustrative of a second type of apparatus which can be used in the practice of the invention.
Figure 5:
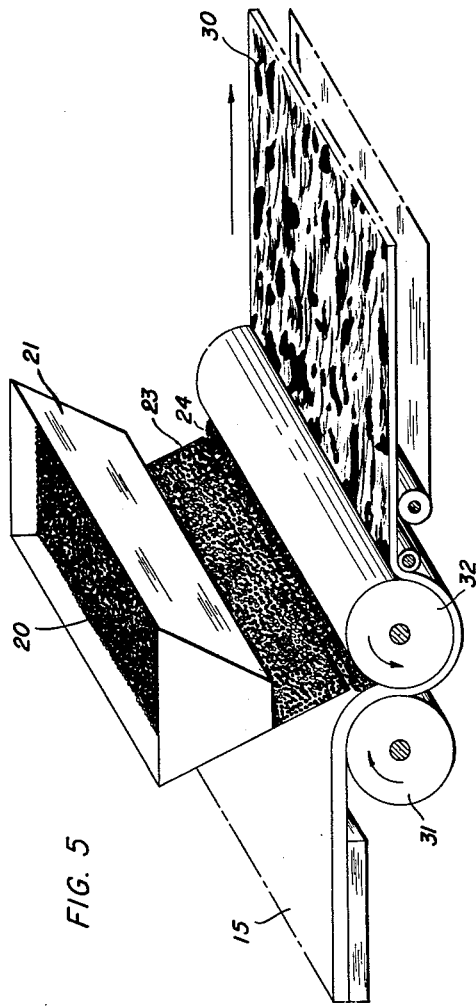
FIG. 5 is a perspective view of the apparatus illustrated in FIG. 4.

In the embodiment shown in FIGS. 4 and 5, the sheet material 19 is fed to horizontal calender rolls 31, 32 in a manner similar to that described above for the vertical calender. The decorative pieces 20 are fed from a hopper 21 down an inclined surface 23. The decorative pieces are held in a rolling bank 24 at the nip of the rolls. In like manner, as described above, the action of the calender roll 32 limits the amount of decorative material fed between the rolls from the rolling bank.

The process of this invention is applicable to any composition material which is thermoplastic enough to be reduced in gauge and calendered to produce smooth sheets of material. Typical of the composition used to produce such sheets are linoleum compositions, rubber compositions, synthetic resinous compositions and natural resinous compositions. Such composition material is usually comprised of binders, fillers, pigments, stabilizers and minor portions of other ingredients. The binder is usually present in from 20 to 80% of the composition and can contain suitable softening agents, such as plasticizers, other resins and the like.

Typical linoleum compositions are composed of drying or semidrying oils, resins, fillers and pigments. The siccative oil can be linseed, tall, perilla, rubberseed or any oil which upon oxidation yields a substantial amount of the oxidized glycerides of linolic and/or linolenic acids in fluid phase. The resin can be rosin, ester gum, fused congo, congo ester, kouri gum or the like. The filler can be ground cork, wood flour, whiting, china clay, asbestine or the like. A typical linoleum formulation contains from about 25 to 50 percent linoleum cement, about 25 to 35 percent vegetable filler and about 25 to 40 percent mineral filler. The linoleum composition is prepared by mixing the siccative oil and resin and oxidizing the mixture while heating. When the linoleum cement has been properly oxidized and aged, it is mixed with the filler and pigment and calendered into a sheet. The initial sheet forming of linoleum is usually carried between rolls at a temperature of about 160° F. to 220° F. and a pressure of about 900 to 1,200 pounds per square inch. The roll contacting the surface of the sheet is usually maintained at a substantially lower temperature than the roll contacting the back of the sheet. The gauge reduction in the second calendering is carried out with the sheet at approximately 150° F. to 250° F. and with rolls maintained at approximately the same temperature as the first calendering. Typical roll temperatures are a back roll of 190° F. and a face roll of 60° F. The plastic composition sheet is fed into the calender at a temperature of about 150° F. The finished sheet is usually cured by maintaining at a temperature of about 180° F. for a period of several weeks. Linoleum compositions can be classified as a thermoplastic material since, during the period of sheet formation, they have all the characteristics of a thermoplastic sheet. It is not until subsequent aging of the composition that it assumes its thermosetting properties.

A particularly useful surface covering can be made by utilizing a composition containing a thermoplastic synthetic resin. Such compositions contain resins, plasticizers, fillers, pigments and stabilizers. The polyvinyl resins are the most widely used in floor and wall coverings and particularly polyvinyl chloride polymers and copolymers of polyvinyl chloride and polyvinyl acetate containing from about 80 to 98 percent vinyl chloride. The resins of this type which are of particular usefulness are thermoplastic resins having a softening point above about 150° F. and specific viscosity above about 0.17 as measured in a solution containing 0.20 gram of resin per 100 milliliters of nitrobenzene at 20° C. Copolymers of vinyl chloride with dibutyl maleate, ethyl acrylate, methyl acrylate, butyl acrylate, methyl ethyl acrylate and butymethylacrylate, all containing substantially the same amount of combined vinyl chloride and having the same viscosity, also have been used. In addition, copolymers of vinyl chloride are used, as well as copolymers of vinyl chloride and vinylidene chloride. Typical of other suitable resins are polyacrylonitrile, polymethylacrylates, and hydrocarbon resins such as polybutylene and polyethylene.

Suitable plasticizers for the thermoplastic resin include tricresyl phosphate, dioctyl phthalate, dicapryl phthalate, dibutyl sebacate, dibutoxy ethyl phthalate, dipropylene glycol dibenzoate, dibutoxyglycol phthalate, polyethylene glycol di-2-ethyl hexoate, triethylene glycol di-2-ethyl hexoate. The filler can be fibrous or non-fibrous or a combination of both. Suitable fibrous fillers are asbestos, cork wood flour, cellulose fibers, fibrous talc, animal fiber and the like. Non-fibrous fillers include asbestine, barytes, calcium carbonate, calcium sulfate, clay, domomite, mica, silica, slate flour, serpentine, talc. The initial mixing of the components is carried out at about 300° F. to about 375° F. and the calendering at a temperature between 250° F. and 350° F.

Rubber compositions can contain either natural or synthetic rubber as the binder. The proportions for such compositions are similar to those for the synthetic resinous composition described above and the processing is carried out in a similar manner, except that rubber compositions usually require a curing period to harden the composition.

A composition used for forming what is conventionally called "asphalt tile" can also be used. Such compositions usually contain binders of light colored natural resins. The most commonly used ones are the paracoumarone indene resins having a melting point above 135° C. A typical formulation contains about 15 to 35 percent resin, about 5 to 15 percent softening agent and the remainder fillers and pigments. Such a composition is usually mixed at a temperature between 250° and 300° F. and initially calendered between rolls maintained at a temperature less than about 230° F.

The decorative pieces are preferably formed of the same composition as the base sheet but of contrasting coloration. The size of the decorative pieces should be closely maintained to produce the desired decorative effect. In the final product, the decorative pieces represent about 5 to 25 percent of the total composition. The decorative pieces are preferably a mixture of two distinct sizes. One size, which preferably represents about 10 to 50 percent of the total decorative stock can be of relatively smaller pieces ranging from about 1/64" to 1/8". The remainder of the stock can be larger pieces which range in size from about 1/16" to about 1/2". A particularly desirable design is obtained when the two relative size pieces are of distinct color characteristics. The particular sizes of the pieces will also depend a large part on the composition utilized. In the softer compositions, such as natural resin, the pieces can be materially smaller than when the harder composition, such as those containing vinyl resins are utilized. The decorative pieces can be conveniently prepared by breaking up thin sheets of composition material about 1/32 to 3/32" thick.

The following examples are given for purpose of illustration.

*Example 1*

The following composition is charged into a Banbury mixer and blended at approximately 300° F. for a period of three minutes:

| | Parts |
|---|---|
| Polyvinyl chloride | 19.0 |
| Tricresyl phosphate | 4.8 |
| Butylbenzyl phthalate | 4.4 |
| Asbestos | 19.0 |
| Calcium carbonate | 48.0 |
| Titanium oxide | 3.8 |
| Stabilizer | 1.0 |

The binder composition is calendered at 300° F. between two rolls maintained at 110° and 210° F., respectively. The composition sticks to the warmer roll which is rotated at a slightly faster speed. The composition is allowed to form a smooth sheet of approximately 0.75 inch thick on the warm roll. The sheet is then removed from the roll and passed to the nip of a second two roll calender. At this point, the sheet has a temperature of about 275° F. The top calender roll is maintained at a temperature of 180° F. and the bottom roll at 90° F. Decorative pieces of the same composition, but of contrasting pigmentation, are maintained as a rolling bank on the surface of the sheet at the nip of the calender rolls. The rolling bank of pieces is maintained by feeding the pieces at the same rate as the calender rolls press them into the sheet. The decorative pieces are composed of 3 parts of pieces of approximately 1/8 to 1/16 inch in size and one part of pieces of approximately 1/16 to 3/64 inch and both about 1/16 inch in thickness. The decorative sheet thus formed has a thickness of 1/8 inch, representing a gauge reduction of over two-thirds and is passed through succeeding calender rolls to reduce its gauge to 0.062 inch in at least two stages. The sheet is then cooled and cut into tiles. The decoration formed on the sheet closely resembles driftwood and extends for a substantial depth in the sheet.

*Example 2*

A conventional linoleum composition is formed containing 37.9% binder which consists of blown and polymerized linseed oil and a small portion of rosin, 27.5% wood flour, 25.7% calcium carbonate and 9.6% pigments, and calendered to form a sheet about 0.50 inch in thickness. The thick sheet at a temperature of about 150° F. is then passed to a two-roll calender having a face roll maintained at 100° F. and a back roll at 180° F. Decorative pieces formed from a similar composition are maintained in a rolling bank on the surface of the thick sheet at the nip of the calender rolls. The decorative pieces are about 0.032 inch thick and made up of about two parts of pieces of approximately 1/8" to 1/16" in size and one part of pieces of approximately 3/64" to 1/16" in size. The calender rolls are adjusted to produce a sheet 0.052 inch in thickness. The sheet is then laminated to an asphalt saturated felt and subjected to the conventional curing at 160° F. for a period of six weeks. The finished sheet has a smooth surface with a decoration characterized by a series of streaks in combination with large areas of color and closely resembles driftwood or pecky cypress.

The precise temperature and temperature differential of the calender rolls will depend in large measure on the particular composition being processed. The temperature of the sheet should be such that it is thermoplastic enough to be readily calendered. The top roll should preferably supply just enough heat to the decorative pieces to become plastic and deformable.

Any departure from the above description which conforms to the present invention is intended to be included in the scope of the claims.

What is claimed is:

1. A process for producing a sheet of composition material having a wood-like decoration which comprises feeding in a plastic state a thick composition sheet to the nip of two calender rolls, maintaining a rolling bank of small pieces of similar composition of contrasting color on the surface of said sheet at said nip and substantially reducing the gauge of said sheet while simultaneously pressing some of said pieces from said bank into the sheet until they are flush with the surface of the sheet by passing between said calender rolls.

2. A process for producing a sheet of composition material having a wood-like decoration which comprises feeding in a plastic state a composition sheet of substantial thickness to the nip of two calender rolls, maintaining a rolling bank of small, irregular pieces of similar composition of contrasting color on the surface of said sheet at the nip of said calender rolls and substantially reducing the gauge of said sheet by passing said sheet with a portion of said pieces between said calender rolls, thereby pressing said pieces into said sheet until they are flush with the surface of the sheet and distorting their shape.

3. A process for producing a sheet of composition material having a wood-like decoration which comprises feeding in a thermoplastic state a composition sheet of substantial thickness to the nip of two calender rolls, continuously feeding small, irregular pieces of at least two distinct sizes of similar composition of contrasting color to the nip of said calender rolls so as to maintain a rolling bank of said irregular pieces, reducing the gauge of said sheet by passing between said calender rolls while simultaneously pressing a portion of said pieces from said bank into said sheet, said feeding of said pieces being at the same rate as the pieces are pressed into the sheet until they are flush with the surface of the sheet.

4. A process for producing a sheet of composition material having a wood-like decoration which comprises feeding in a thermoplastic state a composition sheet of substantial thickness between the nip of two calender rolls to substantially reduce its gauge, said calendering being carried out while maintaining a rolling bank of small pieces of irregular size of similar compositon of contrasting color on the surface of the sheet at the nip of said calender whereby some of said pieces are pressed into said sheet until they are flush with the surface of the sheet and materially distorted in shape.

5. A process for producing a sheet of composition material having a wood-like decoration which comprises feeding in a thermoplastic state a composition sheet of substantial thickness to the nip of two calender rolls, maintaining a uniform rolling bank of small pieces of similar composition of contrasting color on the surface of said sheet across said nip and passing said sheet between said calender rolls to reduce the gauge of said sheet to at least one-third of its original gauge while simultaneously pressing some of said pieces into said sheet until they are flush with the surface of the sheet and materially distorting their shape.

6. A process for producing a sheet of composition material having a wood-like decoration which comprises feeding in a thermoplastic state a composition sheet of substantial thickness to the nip of two calender rolls, maintaining on the surface of said sheet a uniform rolling bank across said nip of small pieces of similar composition of contrasting color and passing said sheet between said calender rolls to reduce the gauge of said sheet to at least one-third and not more than one-fifteenth of its original gauge while simultaneously pressing some of said pieces into said sheet until they are flush with the surface of the sheet during said gauge reduction whereby the shape of said pieces is materially distorted.

7. A process for producing a sheet of composition material having a wood-like decoration which comprises feeding in a thermoplastic state a composition sheet of substantial thickness to the nip of two calender rolls, maintaining a uniform rolling bank on the surface of said sheet at the nip of small pieces of similar composition of contrasting color and passing said sheet between said calender rolls to reduce the gauge of said sheet to at least one-third and not more than one-fifteenth of its original gauge while simultaneously pressing some of said pieces into said sheet until they are flush with the surface of the sheet whereby the shape of said pieces is materially distorted, said pieces being of two distinct sizes, one of said sizes ranging from $\frac{1}{16}$ to $\frac{1}{8}$ inch in diameter and the second of said sizes ranging in size from $\frac{1}{32}$ to $\frac{1}{16}$ inch in diameter.

8. A process for producing a sheet of composition material having a wood-like decoration which comprises feeding in a thermoplastic state a composition sheet of substantial thickness to the nip of two calender rolls, maintaining a uniform rolling bank of small pieces of similar composition of contrasting color on the surface of said sheet at said nip, said pieces comprising from one to four parts of pieces ranging from $\frac{1}{16}$ to $\frac{1}{8}$ inch in diameter and from one to four parts of pieces ranging from $\frac{1}{32}$ to $\frac{1}{16}$ inch in diameter, and passing said sheet between said calender rolls to reduce the gauge of said sheet to at least one-third and not more than one-fifteenth of its original gauge while simultaneously pressing some of said pieces into said sheet until they are flush with the surface of the sheet, whereby the shape of said pieces is materially distorted.

9. A process for producing a sheet of composition material having a wood-like decoration which comprises feeding in a thermoplastic state a composition sheet of substantial thickness to the nip of two calender rolls, maintaining a rolling bank of small, irregular pieces of thermoplastic composition of contrasting color on the surface of said sheet at said nip, passing said thermoplastic sheet between said calender rolls thereby reducing its gauge to less than one-third of its original gauge while simultaneously pressing some of said pieces into the surface of said thermoplastic sheet until they are flush with the surface of the sheet thereby materially distorting their shape.

10. A process for producing a sheet of vinyl composition material having a wood-like decoration which comprises feeding a sheet of vinyl composition in a thermoplastic state to the nip of two calender rolls, maintaining a rolling bank of small, irregular pieces of similar vinyl composition of contrasting color on the surface of said sheet at said nip and pressing some of said pieces into said sheet until they are flush with the surface of the sheet while simultaneously reducing the gauge of said sheet to at least one-third of its original gauge.

11. A process for producing a sheet of vinyl composition material having a wood-like decoration which comprises feeding to the nip of two calender rolls a thermoplastic composition sheet comprising a vinyl resinous binder and asbestos fibers, maintaining a uniform rolling bank of small, irregular pieces of contrasting color of similar composition on the surface of said sheet at said nip and pressing a portion of said pieces from said bank into said sheet until they are flush with the surface of the sheet by simultaneously reducing the gauge of said sheet to at least one-third of its original gauge by passing between said calender rolls, said pieces ranging in size from about $\frac{1}{32}$ to $\frac{1}{8}$ inch in diameter.

12. The process of claim 11, wherein the composition sheet of substantial thickness is fed to the calender rolls at a temperature within the range of about 200° F. to 300° F. and said two calender rolls are maintained at substantially lower temperatures with the warmer of said two rolls contacting the decorative surface of said thick sheet.

13. The process of claim 11, wherein said bank of small, irregular pieces is a rolling bank of approximately ¼ to ¾ inch in diameter.

14. The process of claim 12 wherein said sheet of substantial thickness is approximately 0.75 inch thick.

15. A process for producing a linoleum sheet having a wood-like decoration which comprises feeding in a thermoplastic state a linoleum composition sheet of substantial thickness to the nip of two calender rolls, maintaining a rolling bank of small, irregular pieces of linoleum composition of contrasting color on the surface of said sheet at said nip and substantially reducing the gauge of said sheet by passing between said calender rolls thereby pressing some of said pieces from said bank into the sheet until they are flush with the surface of the sheet while materially altering the shape of said pieces.

16. The process of claim 15, wherein the linoleum sheet of substantial thickness is fed to the calender rolls at a temperature within the range of 150 to 250° F. and said calender rolls are maintained at substantially lower temperatures with the cooler of said two rolls contacting the surface of said thick sheet.

17. The process of claim 15, wherein said bank of small, irregular pieces is a rolling bank of approximately ¼ to ¾ inch in diameter.

18. The process of claim 16, wherein said sheet of substantial thickness is approximately 0.50 inch thick and said sheet is reduced in gauge to about 0.05 inch.

References Cited in the file of this patent

UNITED STATES PATENTS

| | | |
|---|---|---|
| 1,001,836 | Fritz | Aug. 29, 1911 |
| 1,351,679 | O'Brien | Aug. 31, 1920 |
| 2,113,158 | Mayer | Apr. 5, 1938 |
| 2,668,787 | Schramm | Feb. 9, 1954 |
| 2,761,177 | Walters | Sept. 4, 1956 |
| 2,775,994 | Rowe | Jan. 1, 1957 |